US008631236B2

(12) United States Patent
Bugenhagen

(10) Patent No.: US 8,631,236 B2
(45) Date of Patent: Jan. 14, 2014

(54) AUTO FILE LOCKER

(75) Inventor: Michael K. Bugenhagen, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 102 days.

(21) Appl. No.: 13/315,563

(22) Filed: Dec. 9, 2011

(65) Prior Publication Data

US 2013/0151850 A1   Jun. 13, 2013

(51) Int. Cl.
*H04L 29/06* (2006.01)
*G06F 21/62* (2013.01)

(52) U.S. Cl.
CPC .... *G06F 21/6218* (2013.01); *G06F 2221/2107* (2013.01); *G06F 21/6209* (2013.01)
USPC ........................................................ 713/165

(58) Field of Classification Search
USPC ........................................................ 713/165
See application file for complete search history.

(56) References Cited

U.S. PATENT DOCUMENTS

| | | | |
|---|---|---|---|
| 2004/0125782 A1* | 7/2004 | Chang | 370/338 |
| 2004/0128371 A1* | 7/2004 | Park et al. | 709/221 |
| 2005/0050363 A1* | 3/2005 | Naka et al. | 713/201 |
| 2005/0144251 A1* | 6/2005 | Slate | 709/215 |
| 2006/0095514 A1* | 5/2006 | Wang et al. | 709/204 |
| 2007/0283444 A1* | 12/2007 | Jang | 726/26 |
| 2008/0140572 A1* | 6/2008 | Jackson | 705/51 |
| 2008/0168184 A1* | 7/2008 | Freedman et al. | 709/249 |
| 2008/0280646 A1* | 11/2008 | Poo et al. | 455/556.2 |
| 2008/0281165 A1* | 11/2008 | Rai et al. | 600/300 |
| 2009/0319789 A1* | 12/2009 | Wilson et al. | 713/168 |
| 2010/0093273 A1* | 4/2010 | Hohl | 455/7 |
| 2010/0153716 A1* | 6/2010 | Kirihata et al. | 713/165 |
| 2010/0161561 A1* | 6/2010 | Moore et al. | 707/661 |
| 2010/0201845 A1* | 8/2010 | Feinberg et al. | 348/231.99 |
| 2010/0299187 A1* | 11/2010 | Duggal | 705/14.1 |
| 2011/0058516 A1* | 3/2011 | Small et al. | 370/328 |
| 2011/0202625 A1* | 8/2011 | Yu et al. | 709/213 |
| 2011/0313972 A1* | 12/2011 | Albouze | 707/624 |
| 2012/0331108 A1* | 12/2012 | Ferdowsi et al. | 709/219 |

FOREIGN PATENT DOCUMENTS

EP   2363795   * 9/2011   ............... G06F 3/06

OTHER PUBLICATIONS

Bao Xianqiang; Xiao Nong; Shi Weisong; Liu Fang; Mao Huajian; Zhang Hang, "SyncViews: Toward Consistent User Views in Cloud-Based File Synchronization Services," Aug. 22-23, 2011, Chinagrid Conference (ChinaGrid), 2011 Sixth Annual , vol., no., pp. 89,96.*

(Continued)

*Primary Examiner* — Luu Pham
*Assistant Examiner* — Nelson Giddins
(74) *Attorney, Agent, or Firm* — Swanson & Bratschun, L.L.C.

(57) ABSTRACT

Online file locker system, method, and computer software are described. Some such tools can employ a universal serial bus memory drive, a residential gateway, and/or a data server over a network. In some cases, when the universal serial bus memory drive is inserted into a universal serial bus port of the residential gateway, data stored on the universal serial bus memory drive is automatically uploaded to, and/or synchronized with data stored on, the data server, which is in communication with the residential gateway over the network. In other cases, data deletion is accomplished in a similar manner, for example, upon removal of the universal serial bus drive and/or upon detection of files deleted from the universal serial bus drive.

17 Claims, 11 Drawing Sheets

(56) References Cited

OTHER PUBLICATIONS

Cruz, T.; Simões, P.; Bastos, F.; Laranjeira, A., "Managed hybrid storage for home and SOHO environments," May 27-31, 2013, Integrated Network Management (IM 2013), 2013 IFIP/IEEE International Symposium on, vol., no., pp. 185,193.*

Sivathanu, S.; Ling Liu; Mei Yiduo; Xing Pu, "Storage Management in Virtualized Cloud Environment," Jul. 5-10, 2010, Cloud Computing (CLOUD), 2010 IEEE 3rd International Conference on, vol., no., pp. 204,211.*

Raducan, I.; Bigioi, P.; Corcoran, P., "Real-time network-storage for digital cameras," Jan. 13-16, 2012, Consumer Electronics (ICCE), 2012 IEEE International Conference on, vol., no., pp. 402,405.*

\* cited by examiner

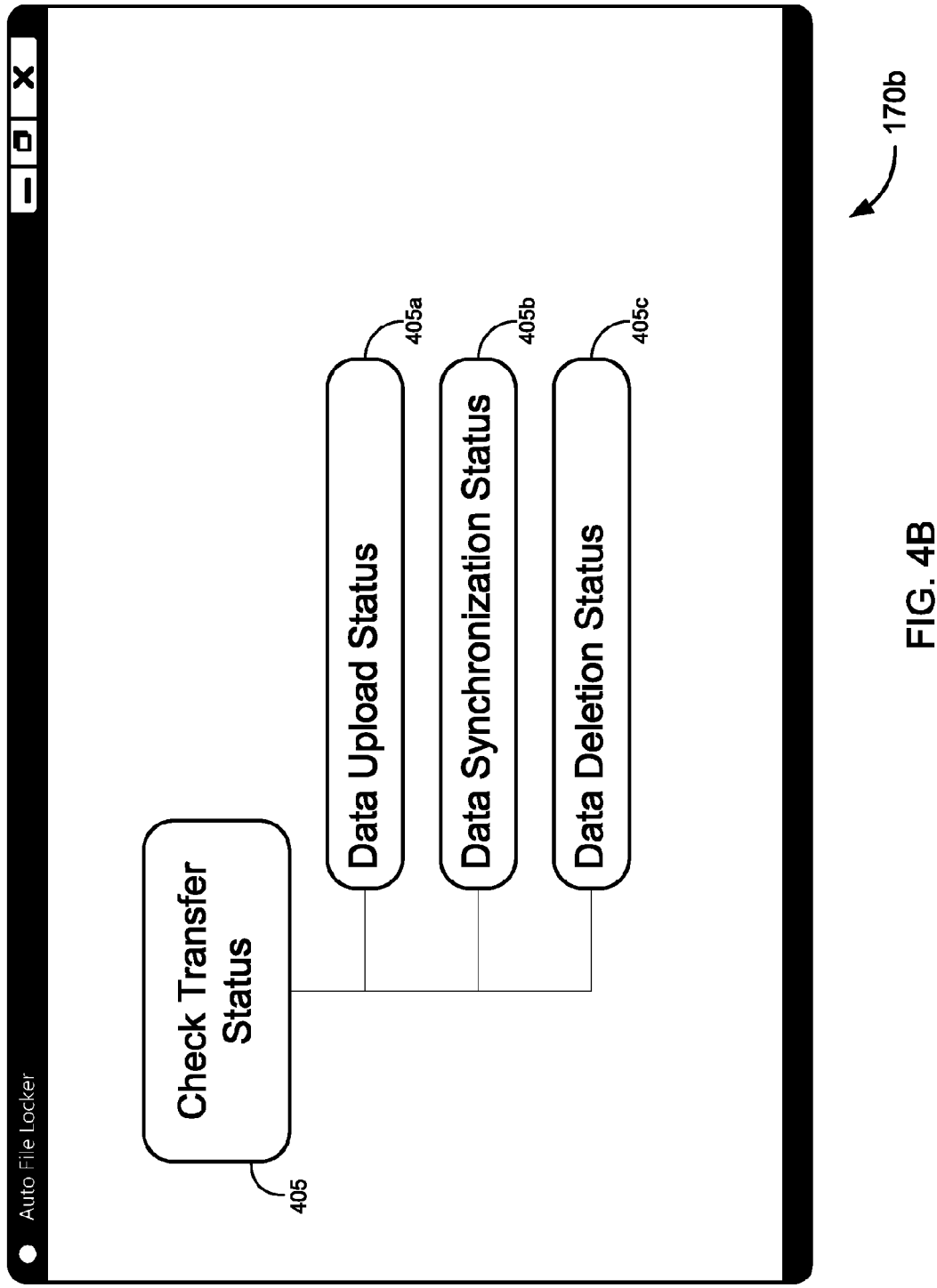

US 8,631,236 B2

AUTO FILE LOCKER

TECHNICAL FIELD

Embodiments relate generally to systems, methods, and computer software for automatic upload and synchronization of data from a USB drive to a data server via use of a residential gateway device.

BACKGROUND

While uploading data to, and synchronizing data with, a remote server over the Internet, a user may experience transfer delays. Typically, the bottleneck in the network occurs between the Internet Interface and the user's network interface device ("NID") or residential gateway ("RG"). This creates problems for customers who need to transfer files over the Internet, but don't have enough bandwidth to support websites or file servers. In many cases, the user upstream bandwidth is extremely low compared to the downstream bandwidth—e.g., 20 MB/s downstream, 2 MB/s upstream—which makes it difficult to transfer a 1 GB file, for example. This problem is especially acute for the bulk of residential ISP customers with slower-speed services, such as 1.5 MB/s with an upload capacity of only 256 KB/s.

Moreover, for many users, the process of uploading files to a website is not intuitive. A relatively unskilled computer user, for example, might want to share some files (e.g., photos, etc.) with friends or family. Conventionally, that user would need to access the upload interface for the website, identify the files on his or her computer (or on an attached thumb drive, etc.), and apply any necessary security restrictions to the uploaded files. These steps can be difficult for many people, and as a result, such users may decide to forego the exercise entirely, thereby losing out on many benefits that the Internet can provide.

Thus, there is a need for more simple and/or robust file transfer solutions for Internet users.

BRIEF SUMMARY

Various embodiments provide tools and techniques to implement an auto file locker system, which in some cases, can synchronize a portable memory device attached to the customer's or service provider's end equipment with a customer file storage space located in the ISP network above the customers access link, thereby providing the customer with a high speed Internet file storage space. Some such solutions can achieve automatic uploading, synchronization, and deletion of data to/with/from the data server (or database in communication with the data server), in many instances simply by tracking the attachment of portable memory at the customer location and synchronizing the files with those on the high speed locker space. This may be accomplished by the use of default settings or rules, preset and/or customizable user preferences, and/or the like.

Certain embodiments of provide tools and techniques that allow users to upload files (and other data) of various size, while overcoming the typical upstream bandwidth and/or technical skill hurdles that plague existing systems. In such a case, even a 1 GB file may be quickly and easily uploaded to the data server. Such embodiments can provide an easy-to-use interface for the upload process, which can be intuitive for both experience users and inexperienced users. Thus, certain embodiments can allow users to quickly and easily upload data with a minimum of administrative overhead.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

According to some embodiments, a system for uploading and synchronizing data includes a data server in an ISP network and a residential gateway (RG) that is in communication with the data server over the ISP network. The RG comprises at least one USB port configured to receive a USB memory drive, and is configured to (i) establish a connection between the ISP network and a residential network, and (ii) upload data stored on the USB memory drive to the data server. The data server is configured to synchronize data on the data server with the data stored on the USB memory drive.

In some embodiments, the residential gateway being configured to upload data stored on the USB memory drive to the data server includes the residential gateway being configured to (a) detect the presence of a USB memory drive connected to the at least one USB port and (b) send a notification to the data server indicating that data stored on the USB memory drive is ready for uploading to, or synchronizing with data on, the data server. The data server, upon receiving said notification from the residential gateway, is configured to initiate uploading of all the data on the USB memory drive to the data server. In some embodiments, the data server, when synchronizing data on the data server with the data stored on the USB memory drive, is further configured to delete data from the data server corresponding to data that has been deleted from the USB memory drive.

In some embodiments, the data stored on the USB memory drive includes at least one of public data, semi-private data, and very private data. Public data is data that is accessible by anyone. Semi-private data is data that is accessible by a single access key that may be shared with anyone. Very private data is data that is only accessible by one or more customer keys each of which correspond to only a single user.

In some embodiments, when the USB port uploads, to the data server, data that is not currently stored on the data server, the data server might be configured to: (1) determine whether the data stored on the USB memory drive is public data, semi-private data, or very private data; (2) create at least one public folder on the data server if it is determined that the data includes public data; (3) create at least one semi-private folder on the data server if it is determined that the data includes semi-private data, wherein the at least one semi-private folder is accessible by the single access key; and (4) create at least one very private folder on the data server if it is determined that the data includes very private data, wherein the at least one very private folder is accessible by the one or more customer keys.

In some embodiments, the data server might be further configured to: (A) generate a URL corresponding to each public folder, semi-private folder, or very private folder that is created on the data server; and (B) perform at least one of: (I) downloading each generated URL to the USB memory drive via the ISP network, and store said each generated URL on the USB memory drive; and (II) sending via e-mail each generated URL to at least one e-mail address corresponding to each user associated with the residential gateway or to at least one e-mail address corresponding to each user associated with the USB memory drive.

In some embodiments, the data server includes a user web interface accessible by the URL; the user web interface might be configured to allow a user to perform at least one of: (a) checking status of data upload, data synchronization, or data deletion; (b) accessing the data stored on the data server; and (c) managing user options including passwords or access keys; security access to particular folders; folder creation and folder name preferences; transfer preferences including data upload, synchronization, and deletion preferences; notification preferences for e-mailing and/or downloading the URL; and updating user profile information including e-mail addresses. In some embodiments, the data server includes a file transfer protocol (FTP) server; the URL might include an FTP file address.

In some embodiments, the at least one USB port includes a first USB port and a second USB port. The first USB port is configured to act as a USB memory drive, wherein when a user computer is connected to the first USB port, the residential gateway is configured to perform at least one of sending a notification to the data server indicating that data stored on the user computer is ready for uploading to, or synchronizing with data on, the data server, and uploading the data stored on the user computer to the data server. The second USB port is configured to receive a USB memory drive, wherein the residential gateway is configured to perform at least one of sending a notification to the data server indicating that data stored on the USB memory drive is ready for uploading to, or synchronizing with data on, the data server, and uploading the data stored on the USB memory drive to the data server.

According to another set of embodiments, a method of uploading data to, and/or synchronizing data with, a data server in an ISP network might include establishing, by a residential gateway, a connection between the ISP network and a residential network, wherein said residential gateway is in communication with the data server over the ISP network; receiving, at least one USB port of the residential gateway, a USB memory drive; and/or performing at least one of: (a) uploading, by the residential gateway, data stored on the USB memory drive to the data server; and (b) synchronizing, by the data server, data on the data server with the data stored on the USB memory drive.

In some embodiments, uploading, by the residential gateway, data stored on the USB memory drive to the data server comprises: detecting, by the residential gateway, the presence of a USB memory drive connected to the at least one USB port; sending, by the residential gateway, a notification to the data server indicating that data stored on the USB memory drive is ready for uploading to, or synchronizing with data on, the data server; and/or uploading, by the data server, all the data on the USB memory drive to the data server, upon receiving said notification from the residential gateway. In some embodiments, synchronizing data on the data server with the data stored on the USB memory drive might include deleting, by the data server, data from the data server corresponding to data that has been deleted from the USB memory drive.

In some embodiments, the data stored on the USB memory drive includes at least one of public data, semi-private data, and very private data. Public data is data that is accessible by anyone. Semi-private data is data that is accessible by a single access key that may be shared with anyone. Very private data is data that is only accessible by one or more customer keys each of which correspond to only a single user.

In some embodiments, when the USB port uploads data to the data server that is not currently stored on the data server, the method might further comprise: determining, by the data server, whether the data stored on the USB memory drive is public data, semi-private data, or very private data; creating, by the data server, at least one public folder on the data server if it is determined that the data includes public data; creating, by the data server, at least one semi-private folder on the data server if it is determined that the data includes semi-private data, wherein the at least one semi-private folder is accessible by the single access key; and/or creating, by the data server, at least one very private folder on the data server if it is determined that the data includes very private data, wherein the at least one very private folder is accessible by the one or more customer keys.

In some embodiments, the method might further include: generating, by the data server, a URL corresponding to each public folder, semi-private folder, or very private folder that is created on the data server; and/or performing at least one of: downloading, by the data server, each generated URL to the USB memory drive via the ISP network, and storing said each generated URL on the USB memory drive; and sending via e-mail, by the data server, each generated URL to at least one e-mail address corresponding to each user associated with the residential gateway or to at least one e-mail address corresponding to each user associated with the USB memory drive.

According to some embodiments, computer software stored on a residential gateway that when executed by the residential gateway can cause the residential gateway to: establish a connection between the ISP network and a residential network, wherein said residential gateway is in communication with the data server over the ISP network; determine that a USB memory drive has been connected to at least one USB port on the residential gateway; and/or send a notification to the data server over the ISP network, said notification indicating that data stored on the USB memory drive is ready for uploading to, or synchronizing with data on, the data server.

According to some embodiments, computer software stored on a data server in an ISP network that when executed by the data server can cause the data server to: determine whether data stored on a USB memory drive connected to at least one USB port at a residential gateway, is ready to be uploaded to the data server via the residential gateway over the ISP network; determine whether the data that is ready to be uploaded to the data server from the USB memory drive is not currently stored on the data server; and/or determine whether the data stored on the USB memory drive that is not currently stored on the data server is public data, semi-private data, or very private data, wherein public data is data that is accessible by anyone, semi-private data is data that is accessible by a single access key that may be shared with anyone, and very private data is data that is only accessible by one or more customer keys each of which correspond to only a single user.

The software might further cause the data server to create at least one public folder on the data server if it is determined that the data includes public data, upload the public data from the USB memory drive, and store, in the at least one public folder, said public data uploaded from the USB memory drive; create at least one semi-private folder on the data server if it is determined that the data includes semi-private data, wherein the at least one semi-private folder is accessible by the single access key, upload the semi-private data from the USB memory drive, and store, in the at least one semi-private folder, said semi-private data uploaded from the USB memory drive; and/or create at least one very private folder on the data server if it is determined that the data includes very private data, wherein the at least one very private folder is accessible by the one or more customer keys, upload the very private data from the USB memory drive, and store, in the at least one very private folder, said very private data uploaded from the USB memory drive. In some embodiments, the software might further cause the data server to: determine whether data has been deleted from the USB memory drive that is currently stored on the data server; and/or delete the data from the data server corresponding to the data that has been deleted from the USB memory drive, based on said determination.

In some embodiments, the software might further cause the data server to: generate a URL corresponding to each public folder, semi-private folder, or very private folder that is created on the data server; and/or perform at least one of: (A) downloading each generated URL to the USB memory drive via the ISP network, and storing said each generated URL on the USB memory drive; and (B) sending via e-mail each generated URL to at least one e-mail address corresponding to each user associated with the residential gateway or to at least one e-mail address corresponding to each user associated with the USB memory drive.

In some embodiments, the software might further cause the data server to generate a user web interface accessible by the URL, wherein the user web interface is configured to allow a user to perform at least one of: checking status of data upload, data synchronization, or data deletion; accessing the data stored on the data server; and managing user options including passwords or access keys; security access to particular folders; folder creation and folder name preferences; transfer preferences including data upload, synchronization, and deletion preferences; notification preferences for e-mailing and/or downloading the URL; and updating user profile information including e-mail addresses.

Various modifications and additions can be made to the exemplary embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-E are exemplary screen displays illustrating a user interface for uploading data to, and/or synchronizing data with, a data server, in accordance with various embodiments.

DETAILED DESCRIPTION

Figure 1:
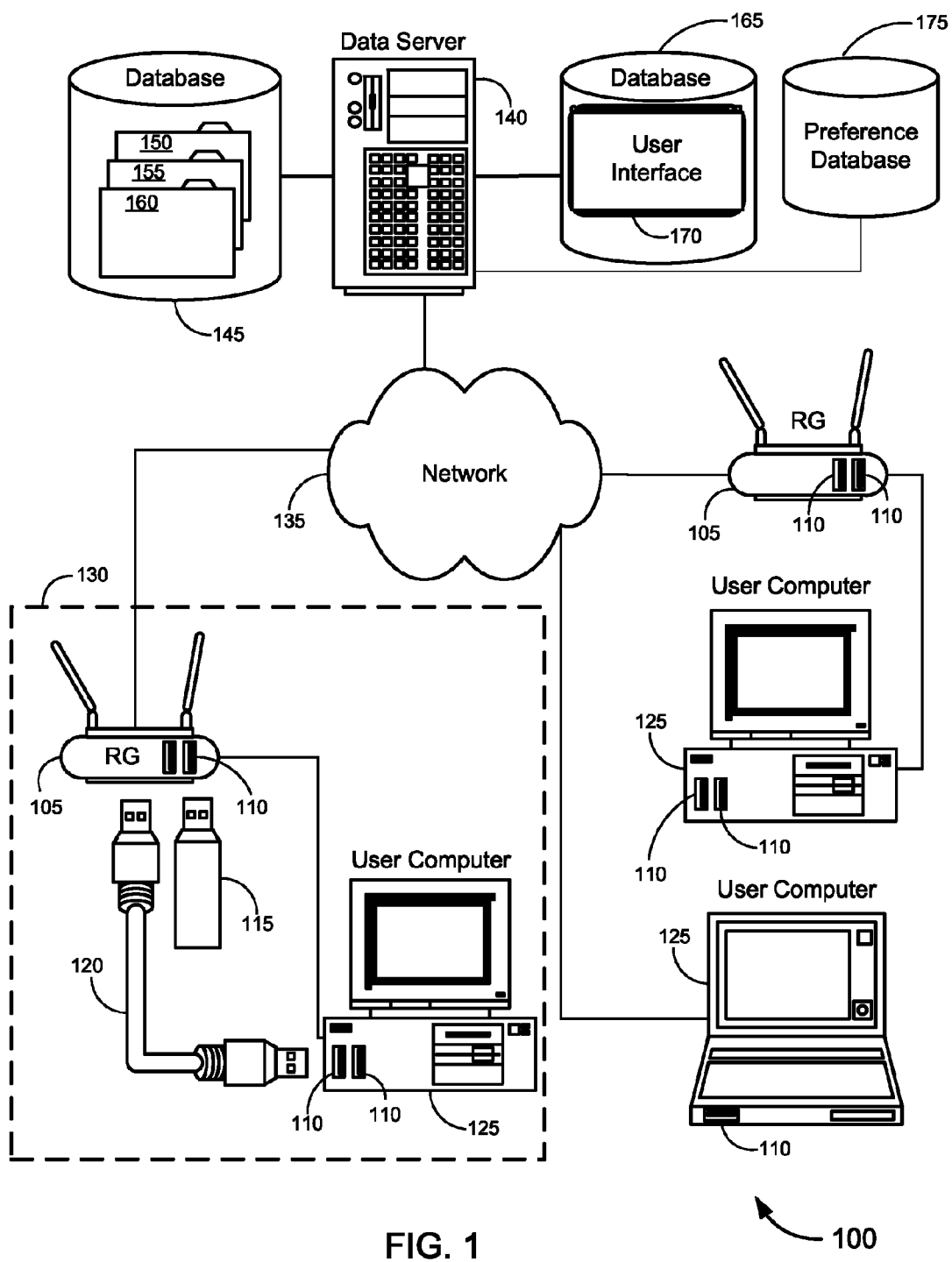
FIG. 1 illustrates a telecommunications system 100 that can be configured to upload data to, and/or synchronize data with, a data server, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide tools and techniques to implement an auto file locker system, which in some cases, can synchronize a portable memory device attached to the customer's or service provider's end equipment with a customer file storage space located in the ISP network above the customers access link, thereby providing the customer with a high speed Internet file storage space. Some such solutions can achieve automatic uploading, synchronization, and deletion of data to/with/from the data server (or database in communication with the data server), in many instances simply by tracking the attachment of portable memory at the customer location and synchronizing the files with those on the high speed locker space. This may be accomplished by the use of default settings or rules (such as "always upload data upon detecting the USB drive in the USB port of the RG," "always synchronize when a data upload or deletion has just been performed," and "always delete, from the data server, all data that has been determined to have been deleted from the USB drive upon detecting the USB drive in the USB port of the RG," etc.), preset user preferences regarding the same, and/or the like.

In some embodiments, the system optimizes file transfers when bandwidth in not in use. Alternatively and/or additionally, the system might provide customer feedback on the synchronization of the files, in order to give the customer knowledge of when files are available and synched on the high-speed location. It should be understood that the term "USB," as used herein (and the techniques described herein)

applies to any simple and portable memory device such as a digital camera memory stick, or other memory device that can be plugged into and/or supported from a typical computer or other electronic device. Thus, this document uses the term "USB" to globally represent the plethora of different memory cards, and devices.

Certain embodiments of provide tools and techniques that allow users to upload files (and other data) of various size, while overcoming the typical upstream bandwidth and/or technical skill hurdles that plague existing systems. In such a case, even a 1 GB file may be quickly and easily uploaded to the data server. Such embodiments can provide an easy-to-use interface for the upload process, which can be intuitive for both experience users and inexperienced users. Thus, certain embodiments can allow users to quickly and easily upload data with a minimum of administrative overhead. For example, the system might create folders on the USB device that indicate webserver, or FTP server, with sub folders labeled upload and download. To this effect, a customer can plug the USB into any laptop and place files for their personal social media webserver or fileserver in the corresponding folders, then simply plug the USB back into the DSL modem, RG or other end device where they are automatically uploaded or synchronized to the high speed locker, once the synchronization is completed a light on the end device, or other customer indicator or communication is issued via text, email, and/or audible indication. In some cases, access levels and passwords, encryption keys, and even Digital Rights Lockers can and may be associated with different folders and or files on the USB to accommodate different classes of "shared" content such as public, family, group, or individual. Such access levels can then be applied, correspondingly, to the online file locker.

In some embodiments, standard web and or file server convention is used to provide an Internet DNS name for the customer to provide to others to access his or her high speed file locker/website. One example would be using the customer's email address as the file locker ftp address, i.e. joe.smith@centurylink.com file locker becomes ftp:// joe.smith@centurylink.com. In this manner the combination of the default addressing schema and the file locker synchronization simplifies both the technical requirements of setting up and maintaining such a web or file server, plus it removes the issue of remote management, and file transfer to and from the server itself, thereby enabling social media by reducing it's complexity to an everyday user skill level. Of course, other possibilities exist as well.

With reference to FIG. 1, one embodiment of the telecommunications system 100 comprises a residential gateway ("RG") 105, network 135, and a data server 140. The RG 105, which includes one or more internal or external USB ports 110, is in communication with the data server 140 over the network 135. The network 135 may be an internet service provider ("ISP") network (e.g., an access network) or any other network; as such, network 135 may include at least one of a local area network, a wide area network, and the Internet, etc. Data server 140 may be a server located at an ISP location or at any location accessible via the Internet or other network.

According to one embodiment, a user or subscriber first transfers data to a USB drive 115. The user, intending to upload the data stored on the USB drive 115, would simply insert the USB drive 115 into one of the USB ports 110 of the RG 105. Upon detecting the presence of the USB drive 115 in one of the USB ports 110, the RG 105 sends a notification signal to the data server 140 via the network 135. The data server 140 then initiates the uploading process and copies all of the data from the USB drive 115 onto folders that are created on the data server 140, or on database 145 (which is in communication with data server 140). The data server 140 also synchronizes data stored on the USB drive 115 with the data stored on the data server 140 (or on database 145). Alternatively, the RG 105 may be configured to initiate the uploading process.

According to some embodiments, the RG 105 may be located within user or customer premises 130. In such a case, the RG 105 may include multi-function network computer appliances used in homes, which may combine one or more DSL modems or cable modems, one or more network switches (for providing LAN switching), one or more consumer-grade routers, and/or one or more wireless access points. The one or more DSL or cable modems, one or more network switches, one or more routers, and one or more wireless access points may be embodied in separate components or may be integrated into a single device or a series of integrated devices having all four functionalities.

According to some embodiments, the RG 105 may be located outside user or customer premises 130. Such an external RG 105 would function in a similar manner, and would comprise similar components and equipment, as described above with regard to RG 105 that is located within customer premises 130. Regardless of location, the RG 105 would serve as a port for uploading/synchronizing data with the data server 140, as well as acting as a gateway to network 135 for user computer 125.

In some embodiments, the RG 105 comprises a second USB port 110 that is configured to act as a USB memory drive. In particular, when a user computer 125 is connected to this second USB port 110, the RG 105 performs at least one of two things: (1) the RG 105 sends a notification to the data server 140 indicating that the data stored on the user computer 125 is ready for uploading to, or synchronizing with the data on, the data server 140 (or on database 145); and (2) the RG 105 uploads the data stored on the user computer 125 to the data server 140 (or database 145). In practice, a user interface 170 on the user computer 125 would allow the user to select files, documents, or other electronic data (including photographs, images, spreadsheets, etc.) for uploading. These selected data may be copied (or moved) to a transfer folder created on the user computer 125. When the user computer 125 is connected to this second USB port 110, the data stored in the transfer folder would be uploaded to the data server 140 (or the database 145).

In some cases, the creation of the transfer folder and the copying (or moving) of the selected files, documents, or other electronic data are performed prior to connection of the user computer 125 to USB port 110. However, if it is determined that the transfer folder does not exist on the user computer 125 when the user computer 125 is connected to the second USB port 110, the data server 140, some preinstalled software on the user computer 125 (that is associated with the RG 105), or the RG 105 can (a) cause the creation of a transfer folder on user computer 125, and/or (b) invoke the user interface on the user computer 125 to prompt the user to select files, documents, or other electronic data (including photographs, images, spreadsheets, etc.) for copying (or moving) to the transfer folder, for uploading/synchronizing with the data server 140. The determination of the existence of the transfer folder on the user computer 125 may be performed by the data server 140, the preinstalled software on the user computer 125 (that is associated with the RG 105), and/or the RG 105 itself.

Additionally, or in the alternative, preference database 175, which is in communication with data server 140 may be preset with defaults or may be updated with user preferences with respect to the course of action that the data server 140 would take in, e.g., the following non-limiting circumstances: (i) when a transfer folder exists on the user computer 125, and data is stored therein; (ii) when a transfer folder exists on the user computer 125, but no data is stored therein; (iii) when a transfer folder does not exist on the user computer 125; (iv) when a user interface for transferring data is not installed on the user computer 125; etc. The preference database may also be preloaded with defaults or may be updated with user preferences with respect to where on the user computer 125 to search for a transfer folder.

According to some embodiments, USB drive 115 may include a transfer folder created thereon. In such a case, only the data stored in the transfer folder is uploaded to/synchronized with the data server 140 (or database 145), and the creation and handling of the transfer folder will be as described above with respect to the transfer folder on the user computer 125. (Optionally, the RG 105 might create such a folder if the drive 115 is inserted without the existence of such a folder.) Otherwise, however, all data on the USB drive 115 might deemed for uploading to (or synchronizing with) the data server 140 (or database 145). In this case, the insertion of the USB drive 115 in USB port 110 triggers the uploading/synchronization process for all data stored on the USB drive 115. Regardless of whether transfer folder is used for the USB drive 115, data may be transferred to the USB drive 115 via use of the user computer 125 (and user interface installed thereon).

As noted above, in an aspect, the system 100 comprises a user interface 170. The user interface can allow users to interact with the system 100 and/or components thereof (such as the user computer 125, the RG 110, and/or the data server 140. A variety of user interfaces may be provided in accordance with various embodiments, including without limitation graphical user interfaces that display, for a user, display screens for providing information to the user and/or receiving user input from a user. (Several examples of such display screens are described below.)

Merely by way of example, in some embodiments, the data server 140 and/or the RG 105 may be configured to communicate with a client computer (such as the user computer 125) via a dedicated application running on the client computer; in this situation, the user interface might be displayed by the client computer, based on data and/or instructions provided by the data server 140 and/or the RG 105. In this situation, providing the user interface might comprise providing instructions and/or data to cause the client computer to display the user interface. In other embodiments, the user interface may be provided from a web site, e.g., by providing a set of one or more web pages, which might be displayed in a web browser running on the user computer 125 and/or might be served by a web server (not shown on FIG. 1). In various embodiments, the data server 140 and/or the RG 105 might comprise the web server and/or be in communication with the web server, such that the data server 140 and/or the RG 105 provides data to the web server to be incorporated in web pages served by the web server for reception and/or display by a browser at the user computer 125.

As illustrated, data used to generate the user interface 170 is stored in the database 165 and provided by the data server 140 (or a web server in communication therewith); it should be appreciated however, that this data could be stored, and/or the user interface 170 provided by, any appropriate device in the system 100, including without limitation, the data server 140, the RG 105, and/or the user computer 125. In some cases, more than one of these components might provide a user interface 170. For example, the user computer 125 might provide a user interface 170 (and/or might display a user interface 170 provided by another system component) for the user to add files to a USB drive, as described in further detail below. In other cases, the data server 140 (and/or a web server in communication therewith) might provide a user interface 170 (which could be displayed by the user computer 125 or any other capable device, such as a smart phone, etc.) for a user to browse uploaded files, set user preferences, etc.

Figure 2A:
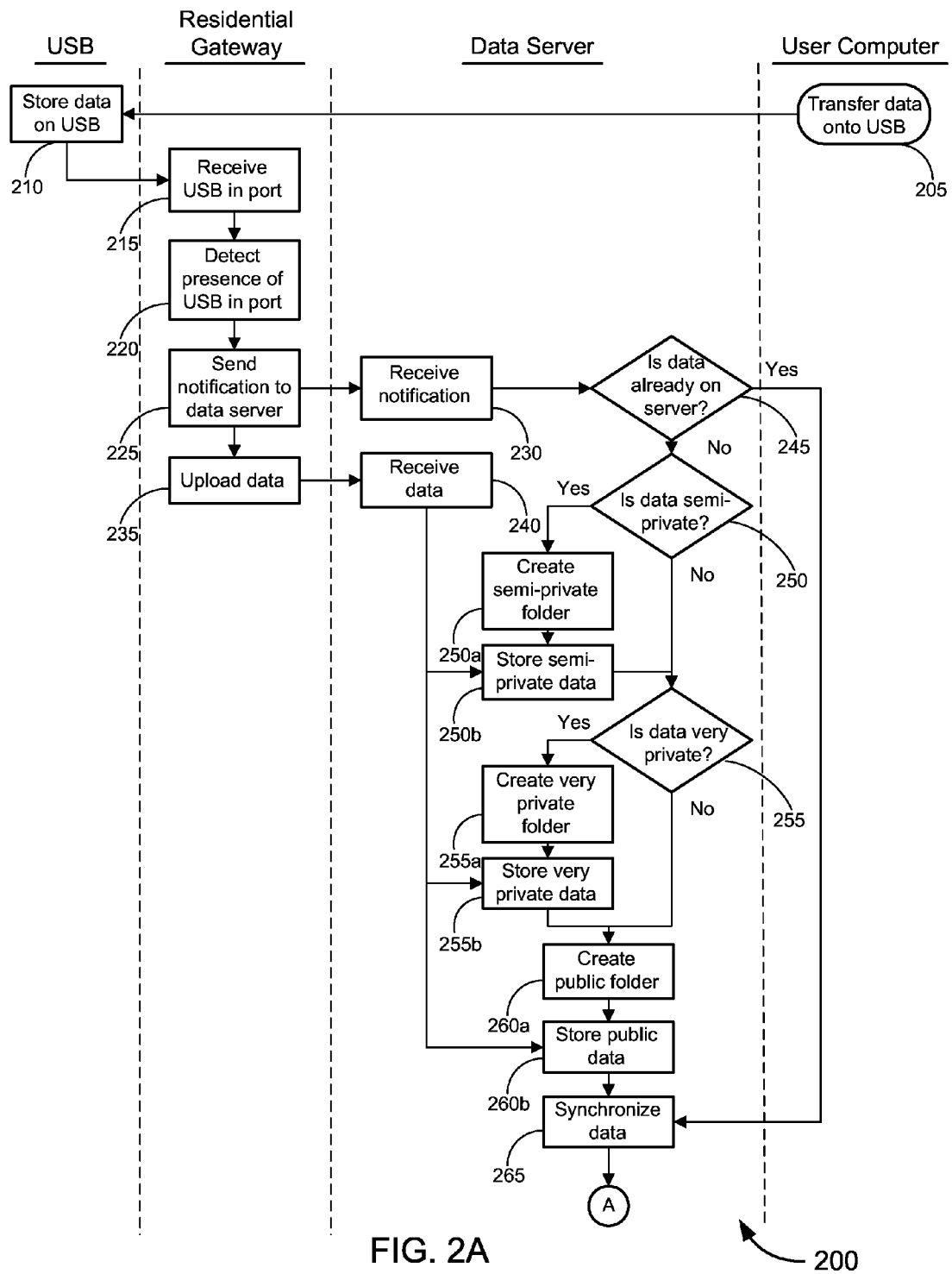
FIGS. 2A, 2B and 3 are process flow diagrams illustrating methods of uploading data to, and/or synchronizing data with, a data server, in accordance with various embodiments.
Figure 2B:
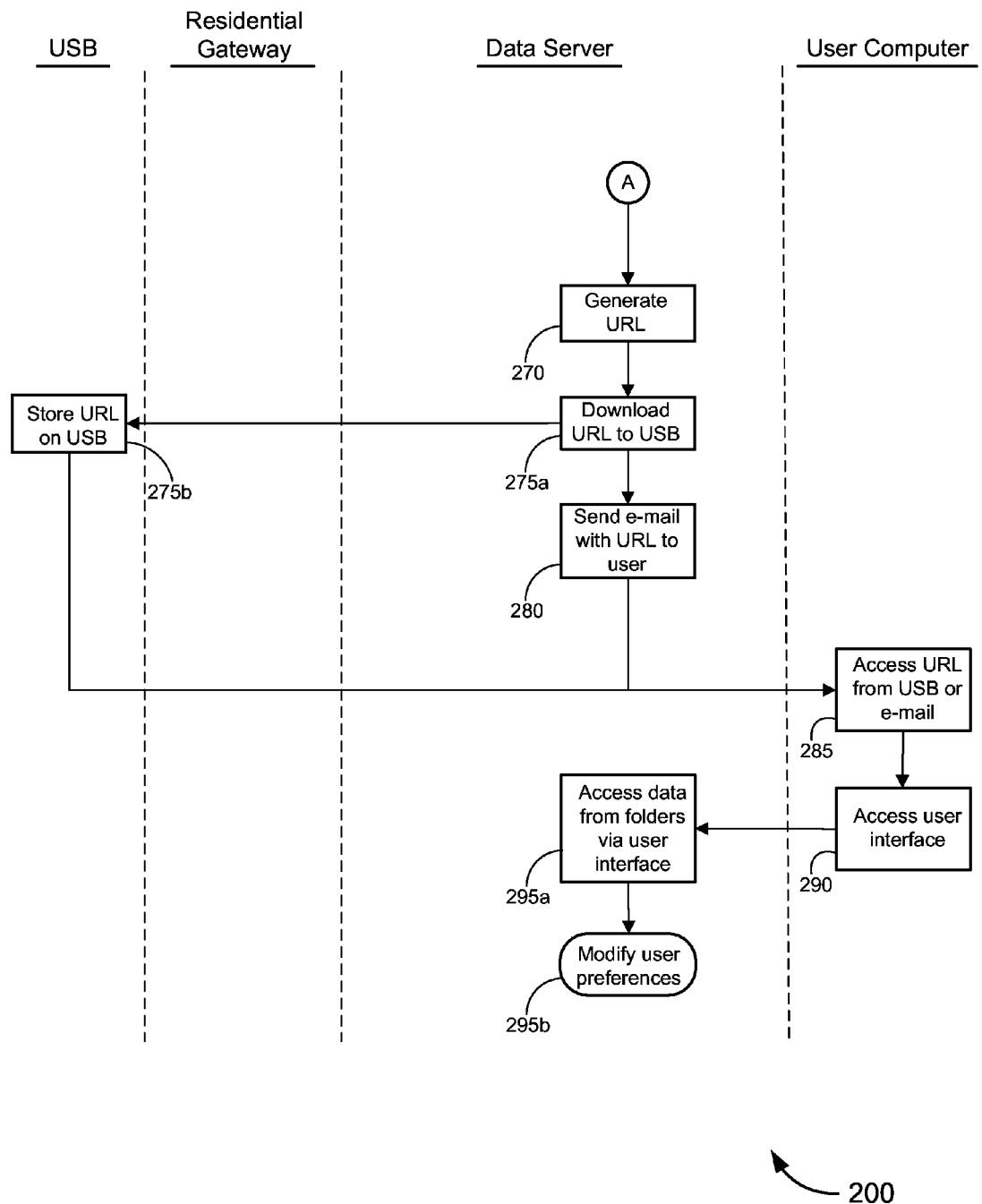
Figure 3:
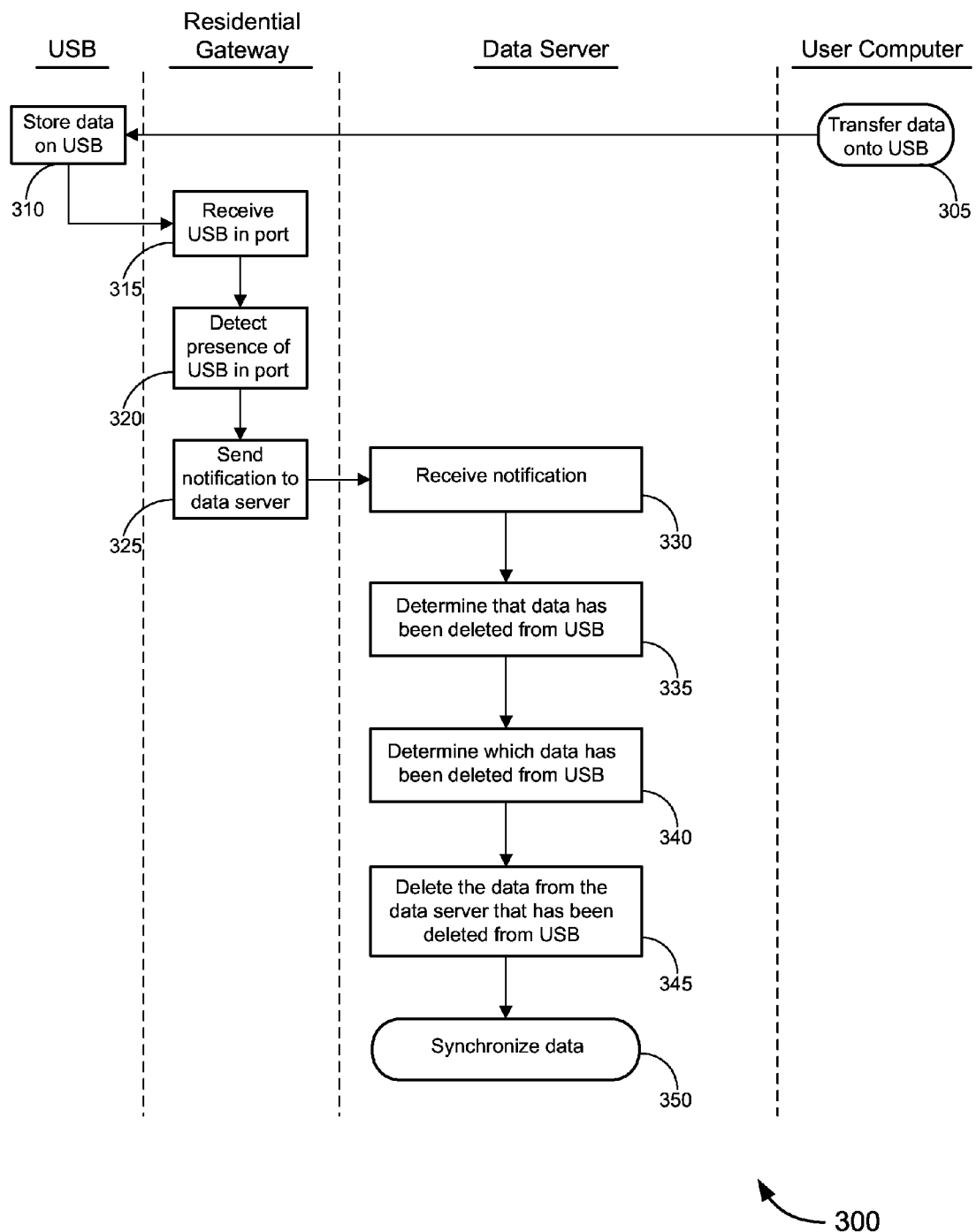

FIGS. 2A, 2B, and 3 illustrate various methods that can be used to upload and/or synchronize data in accordance with various embodiments. While the methods of FIGS. 2A, 2B, and 3 are illustrated, for ease of description, as different methods, it should be appreciated that the various techniques and procedures of these methods can be combined in any suitable fashion, and that, in some embodiments, the methods depicted by FIGS. 2A, 2B, and 3 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 2A, 2B, and 3 can be implemented by (and, in some cases, are described below with respect to) the system 100 of FIG. 1 (or components thereof), these methods may also be implemented using any suitable hardware implementation. Similarly, while the system 100 of FIG. 1 (and/or components thereof) can operate according to the methods illustrated by FIGS. 2A, 2B, and 3 (e.g., by executing instructions embodied on a computer readable medium), the system 100 can also operate according to other modes of operation and/or perform other suitable procedures.

With reference to FIGS. 2A and 2B, some embodiments include a process for uploading data to, and synchronizing data with, the data server 140 (or database 145). At block 205, the user selects files, documents, or other electronic data (which can include, but are not limited to, photos and other image files, video files, spreadsheets, etc.) for uploading.

In an aspect, the method 200 can comprise providing a user interface to allow interaction between a user and one or more system components (such as the user computer 125, the RG 105, and/or the data server 140. For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc. The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

In many cases, providing a user interface will comprise providing one or more display screens (a few examples of which are described below), each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output. Merely by way of example, in a set of embodiments, the user interface allows the user to select files for uploading (as indicated by block 205) by interacting with a user interface provided by the user computer 125 (and/or the RG 105 and/or data server 140). Merely by way of example, the user interface may prompt whether the user desires to create a transfer folder on the USB drive 115. If so, only data copied (or moved) to the transfer folder on the USB drive 115 will be slated for uploading to (or synchronizing with the data on) data server 140 (or database 145). If not, all the data copied (or moved) to the USB drive 115 will be slated for uploading to (or synchronizing with the data on) data server 140 (or database 145). At block 210, once selected, the data (including the files, documents or other electronic data) is stored on the USB drive 115 (and/or or on a transfer folder created on the USB drive 115).

When the user inserts the USB drive 115 into the RG 105 (block 215), the RG 105 detects the presence of the USB drive 115 in USB port 110 (block 220), and sends a notification to data server 140 over network 135 indicating that data stored on the USB drive 115 (or stored in the transfer folder on the USB drive 115) is ready for uploading to, or synchronizing with data on, the data server 140 (or database 145) (block 225).

Upon receiving the notification from the RG 105 (at block 230), the data server 140 determines whether data is already stored on data server 140 (or in database 145) (block 245). If so, data server 140 initiates a synchronizing process in which data stored on the USB drive 115 (or in the transfer folder on the USB drive 115) is synchronized with the data already stored on the data server 140 (or in database 145) (block 265).

If not, the data server 140 determines whether any data stored on the USB drive 115 (or in the transfer folder on the USB drive 115) is semi-private data (block 250). If so, data server 140 creates a semi-private folder(s) 155 either on data server 140 or in database 145 (at block 250). Meanwhile, the RG 105 uploads the data to the data server 140 (at block 235), which in turn receives the uploaded data (block 240). At block 250b, data server 140 stores the semi-private data in semi-private folder(s) 155.

At block 255, the data server 140 determines whether any data stored on the USB drive 115 (or in the transfer folder on the USB drive 115) is very private data. If so, the data server 140 creates a very private folder(s) 160 either on data server 140 or in database 145 (block 255a), and stores the very private data uploaded from USB drive 115 in very private folder(s) 160.

Even if no semi-private data or very private data is determined to be stored on the USB drive 115, the data server 140 creates a public folder(s) 150 either on data server 140 or in database 145 (block 260a), and stores the (remaining) data uploaded from the USB drive 115 in the public folder(s) 150 (at Step 260b). After storing the data in the various folders described above, the data server 140 may initiate a synchronization process (block 265), or may proceed to block 270, shown on FIG. 2B.

At block 270, the data server 140 generates a URL corresponding to each public folder 150, each semi-private folder 155, and/or each private folder 160 that is created on the data server 140 (or on database 145) on which data have been uploaded and stored from the USB drive 115. Based on user preferences stored in preference database 175, the data server 140 performs one or both of the following: (1) downloads each generated URL to the USB memory drive 110 (block 275a) and stores the URL on the USB memory drive 110 (block 275b); and/or (2) sends, via an e-mail, each generated URL to at least one e-mail address corresponding to each user associated with the RG 105 or to at least one e-mail address corresponding to each user associated with the USB memory drive 110 (block 280). Other possibilities exist as well. For example, if the ISP maintains a webpage for the user to access files, the URLs might be added to that page, in lieu of (or in addition to) downloading the URLs the USB drive or emailing the URLs to the user.

Upon receiving the generated URL, the user may utilize user computer 125 to access the URL (or website) (block 285). Upon arriving at the website located at the generated URL, the user will encounter user interface 170 (block 290), which will allow the user to access one or more of the public folder(s) 150, the semi-private folder(s) 155, and the very private folder(s) 160, in order to access data stored therein (block 295a). The user may also utilize the user interface 170 to access and modify the user preferences stored in preference database 175 (block 295b), as discussed in detail below with reference to FIGS. 4A-4E. User interface 170 may be provided by data server 140, database/server 165, a webserver in communication with one (or both) of those servers, and/or the user computer 125.

One key feature of certain embodiments is that that customer may use the URL to post comments and or content to other webservers, and completely remove said content from the Internet by simply pulling the USB, and/or removing the files thereon. This functionality of removing one's fingerprints and content is placed directly in the customer's control, and also can be accessible via the customer GUI interface. A logical extension of this type of customer interface is Internet web forum functionality. Historically, forum systems accept and store typed characters, which remain on the web forum server and are no longer the property or control of the user. However, these same forum servers allow pictures and content to be displayed from third party file servers. Thus the concepts described herein can allow a modification of conventional online forums to allow text and files from a user's online file locker to provide content for online postings. Provided a browser allows a user to type text and automatically generate a text file and link to that file, the overall system and reference URL (address for the content or text files) could be automated and simplified so that users can retain control and ownership of their social content.

With reference to FIG. 3, some embodiments include a process 300 for automatically deleting data from data server 140 (or database 145). At block 305, the user selects files, documents, or other electronic data (including photographs, images, spreadsheets, etc.) for replacing data already stored on USB drive 115, for example, by interacting with a user interface installed on the user computer 125 (much like the process described above with respect to block 205). Alternatively, using the user interface, the user deletes one or more data files from the USB drive 115. Blocks 315-330 are functionally similar to blocks 215-230, respectively, described above. At block 335, data server 140 determines that data has been deleted from (or replaced on) the USB memory drive 115. In particular, data server 140 determines which data has been deleted from (or replaced on) the USB memory drive 115 (block 340). In some embodiments, blocks 335 and 340 may be performed as one operation. Data server 140 subsequently, at block 345, deletes the data that has been identified as having been deleted from USB memory drive 115 from the data server 140 (or from database 145). Data server 140 then (optionally) performs a synchronization process to synchronize the data stored on the USB drive 115 with the data stored on data server 140 (or database 145) (at block 350). In some embodiments, if it is determined that one or more of the public folder(s) 150, the semi-private folder(s) 155, or the very private folder(s) 160 are empty, data server 140 may delete the empty folder(s) based on user preferences stored in preference database 175 or based on established default settings.

According to some embodiments, data stored on the USB drive 115 may be replaced with other data. In the alternative, some or all data stored on the USB drive 115 are deleted, while new data is stored on the USB drive 115. In both these cases, the process for deletion as described in relation to FIG. 3 and block 335-350 above may be invoked prior to the uploading/synchronization process as described in relation to FIG. 2 and blocks 235-295b. Steps 205-230 could be combined with blocks 305-330 in such a case.

In further embodiments, as mentioned above, if the data server detects that the USB drive has been removed from the RG, the data server might automatically delete the uploaded files from the file locker (in a manner similar to that described with respect to FIG. 3). In this way, for example, a user can maintain easy control over online files—when the USB drive is inserted into the RG, the files thereon will be placed in the online locker, and when the USB drive is removed from the RG, the files will be removed from the online locker. In such embodiments, the user need not worry about complicated delete operations (or even about removing files from the USB drive) in order be able to share files while still ensuring that files are not inadvertently left online after the user desires their removal.

With reference to FIGS. 4A-4E, the user interface 170 is described in general terms with regard to some of the functionalities associated with the embodiments described above. The present invention is not limited to the functionalities discussed below, and may include similar functionalities.

Figure 4A:
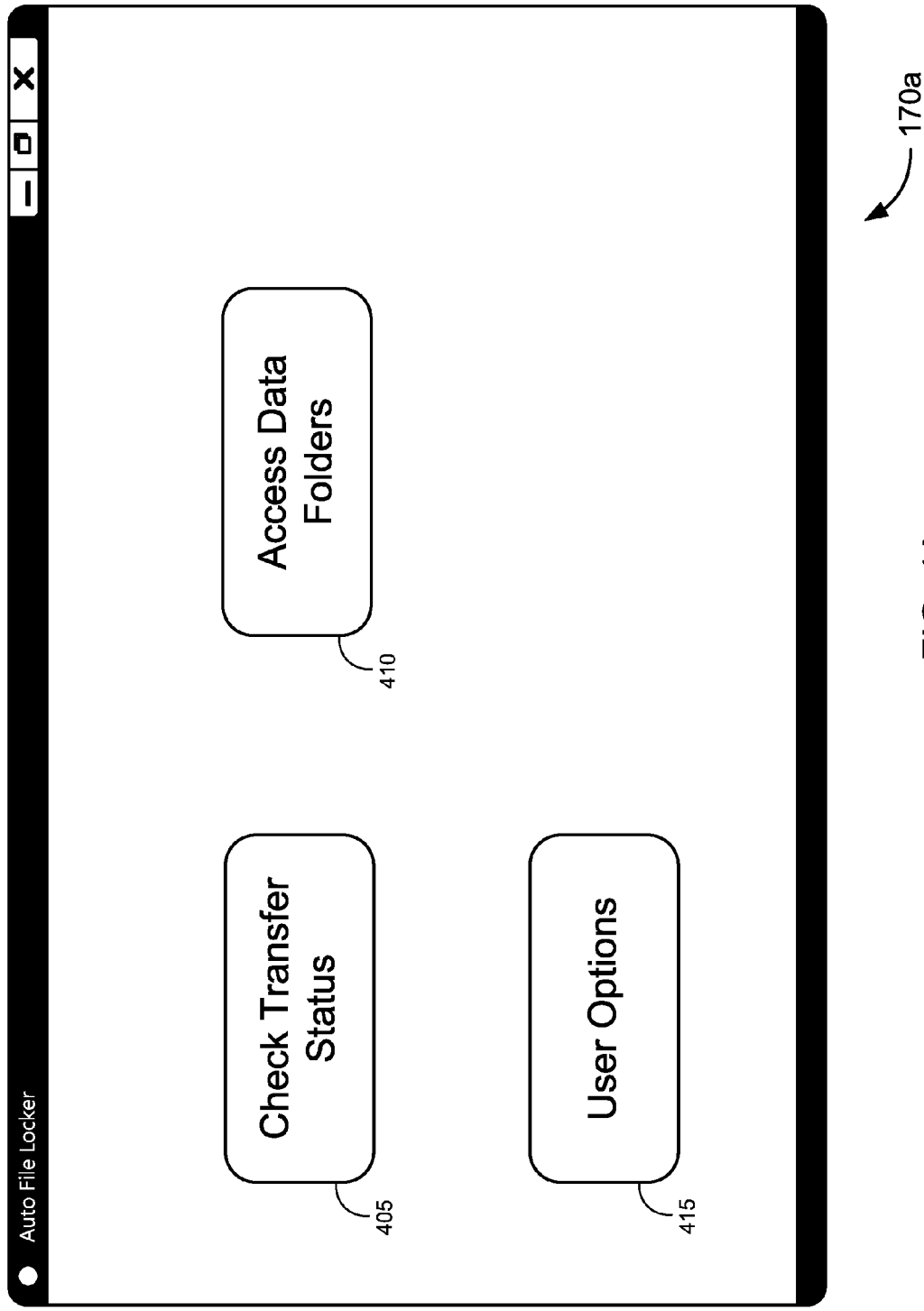

Turning to FIG. 4A, upon accessing the URL generated at block 270 (and/or at block 285 in FIG. 2B), the user is taken to a website associated with the generated URL, where the system might provide, (at block 290 in FIG. 2B) in the user interface, a display screen 170a, which might be a web page, etc. This display screen 170a might serve either by data server 140 or database/server 165. (Alternatively and/or additionally, the display screen 170a might be a general interface to the file locker system, and the generated URL might directly address the uploaded file.)

The display screen 170a can include user interface devices to allow the user to choose from various options: (a) check the transfer status of any uploading, synchronization, or deletion process, e.g., by clicking on the Check Transfer Status button or link 405; (b) access one or more of the data folders (including any public folder(s) 150, semi-private folder(s) 155, and very private folder(s) 160) associated with a user who is associated with the RG 105 or the USB drive 110, by clicking on the Access Data Folders button or link 410; and (c) access user options, by clicking on the User Options button or link 415.

With reference to FIG. 4B, when the user clicks on the Check Transfer Status button or link 405, the user interface might provide a display screen 170b, which expands the selection to provide user interface devices for several user options for checking the transfer status, including (but not limited to): (i) checking data upload status, by clicking on the Data Upload Status button or link 405a; (ii) checking data synchronization status, by clicking on the Data Synchronization Status button or link 405b; and (iii) checking data deletion status, by clicking on the Data Deletion Status button or link 405c.

Figure 4C:
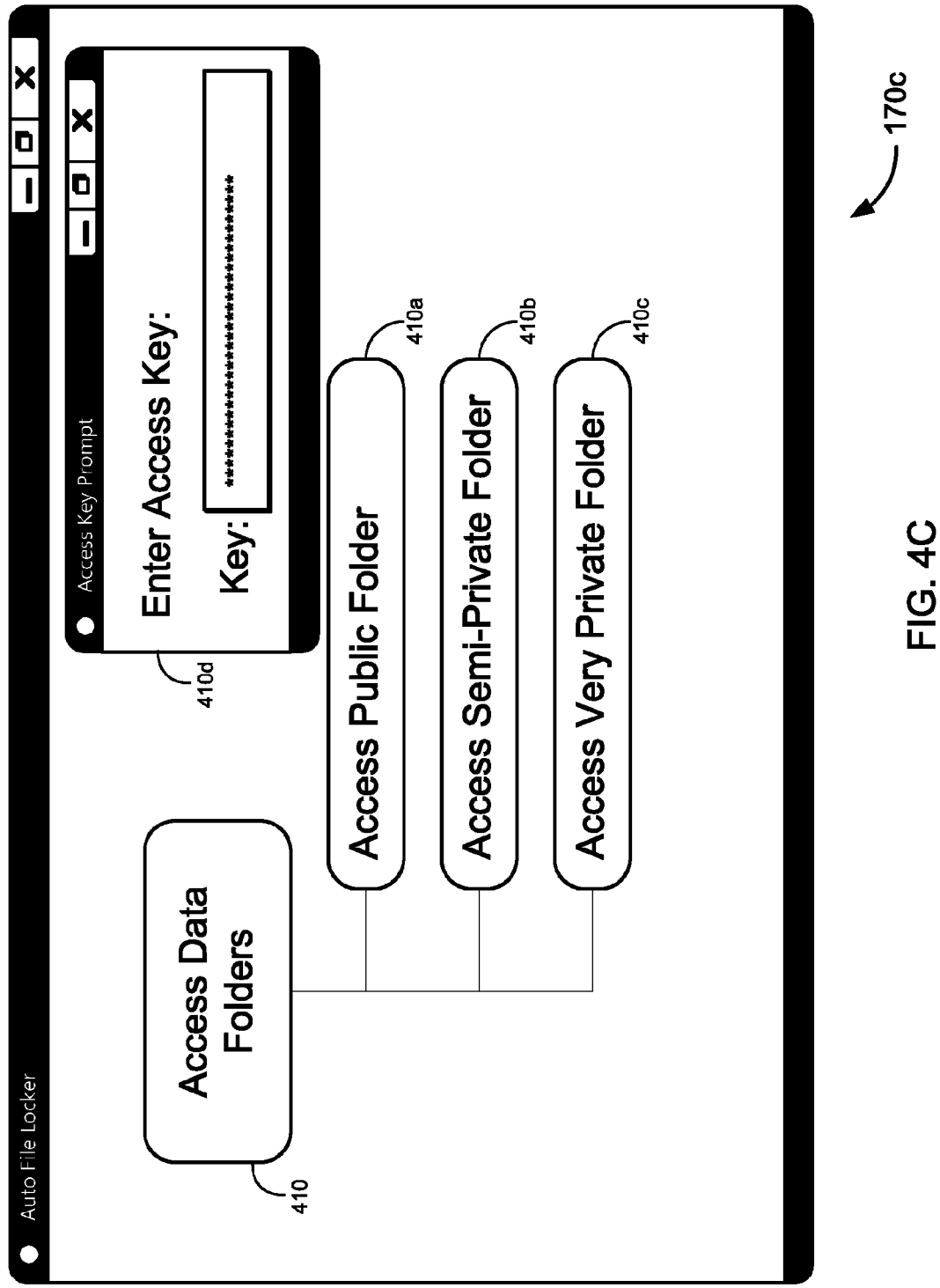

Turning to FIG. 4C, when the user clicks on the Access Data Folders button or link 410, the user interface might provide a display screen 170c, which expands the selection to provide user interface devices for various additional options for accessing the folders, including (but not limited to): (i) accessing the public folder 150, by clicking on the Access Public Folder button or link 410a; (ii) accessing the semi-private folder 155, by clicking on the Access Semi-Private Folder button or link 410b; (ii) accessing the very private folder 160, by clicking on the Access Very Private Folder button or link 410c. When the user clicks on either the Access Semi-Private Folder button or link 410b or the Access Very Private Folder button or link 410c, an Access Key Prompt 410d will appear, requiring the user to enter an access key. The term "access key" can be interpreted to mean any authentication token, and the nature of the access key can depend on the authentication scheme selected. For example, the access key might be a username, a password, or a username/password combination. In other cases, the access key might be a PGP keypair (or either a public or private PGP key), an authentication certificate (provided by the ISP or a third party), etc.

In some cases, to access the semi-private folder 155, a single access key (which can be shared by the user with appropriate other users who should have access to the semi-private folder) may be used. In contrast, to access the very private folder 160, one or more customer keys, each of which correspond to only a single user (e.g., the user who uploaded the files) might be used. This distinction in the access keys highlights the distinction, in one embodiment, of the data being stored in the semi-private folder 155 versus in the very private folder 160—namely, that shared access by a selected group of people is given to the semi-private data, and so only a single access key is used and shared, whereas restricted access by a selected group of people is given to very private data for which each user must use his or her individual access key in order to access the data in the very private folder 160. The public folder 150, by its very nature, does not require an access key to access the data stored therein. Thus, in an aspect of some embodiments, public data can be accessible without authentication, semi-private data can be accessible, with authentication, to a group of people (who can be implicitly authorized by the uploading user by sharing an access key with those people or who can be explicitly authorized individually, e.g., with different username/password combinations), and private data can be accessed only by the uploading user (or with others that have been individually authorized by the uploading user).

Figure 4D:
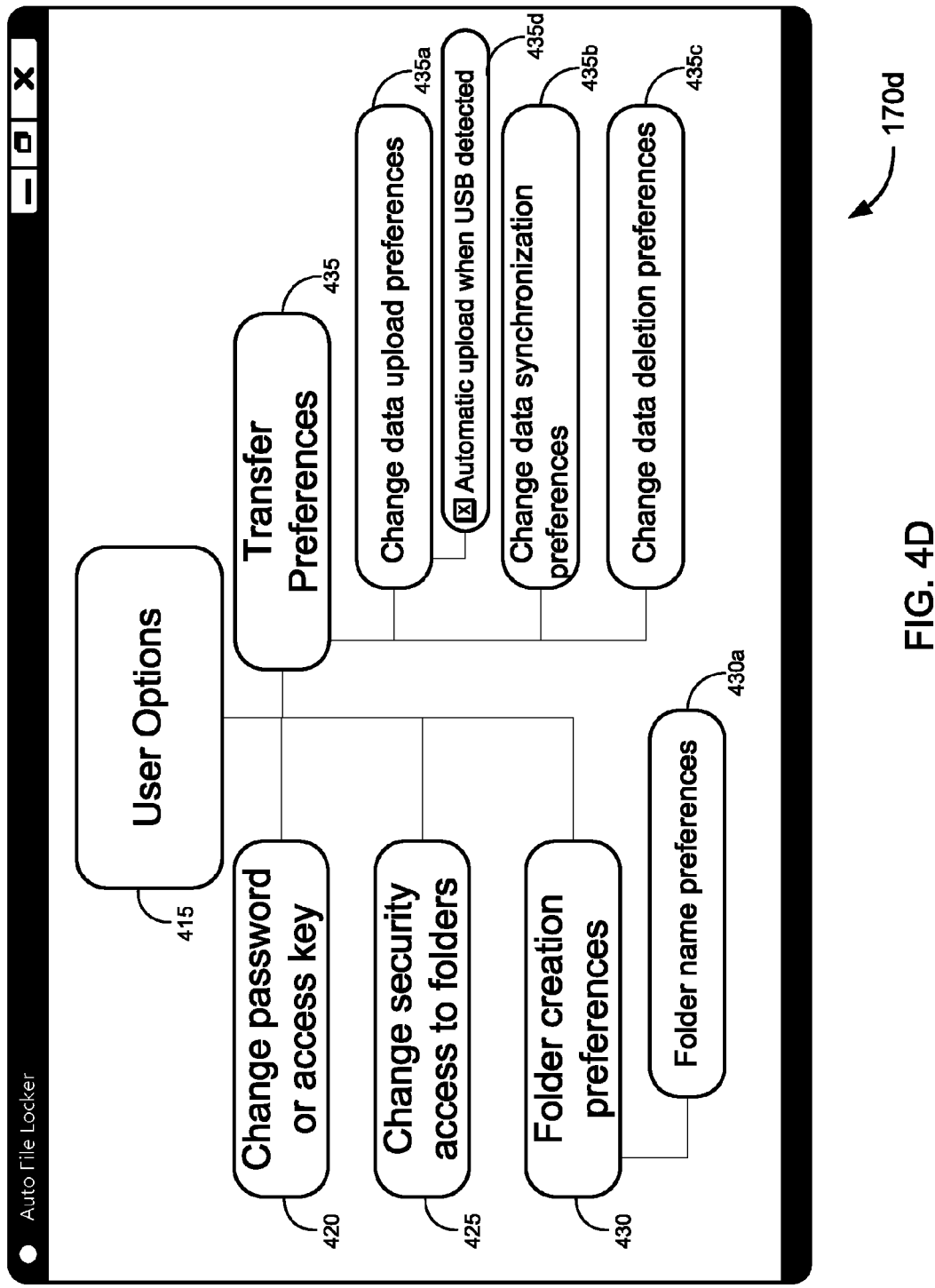
Figure 4E:
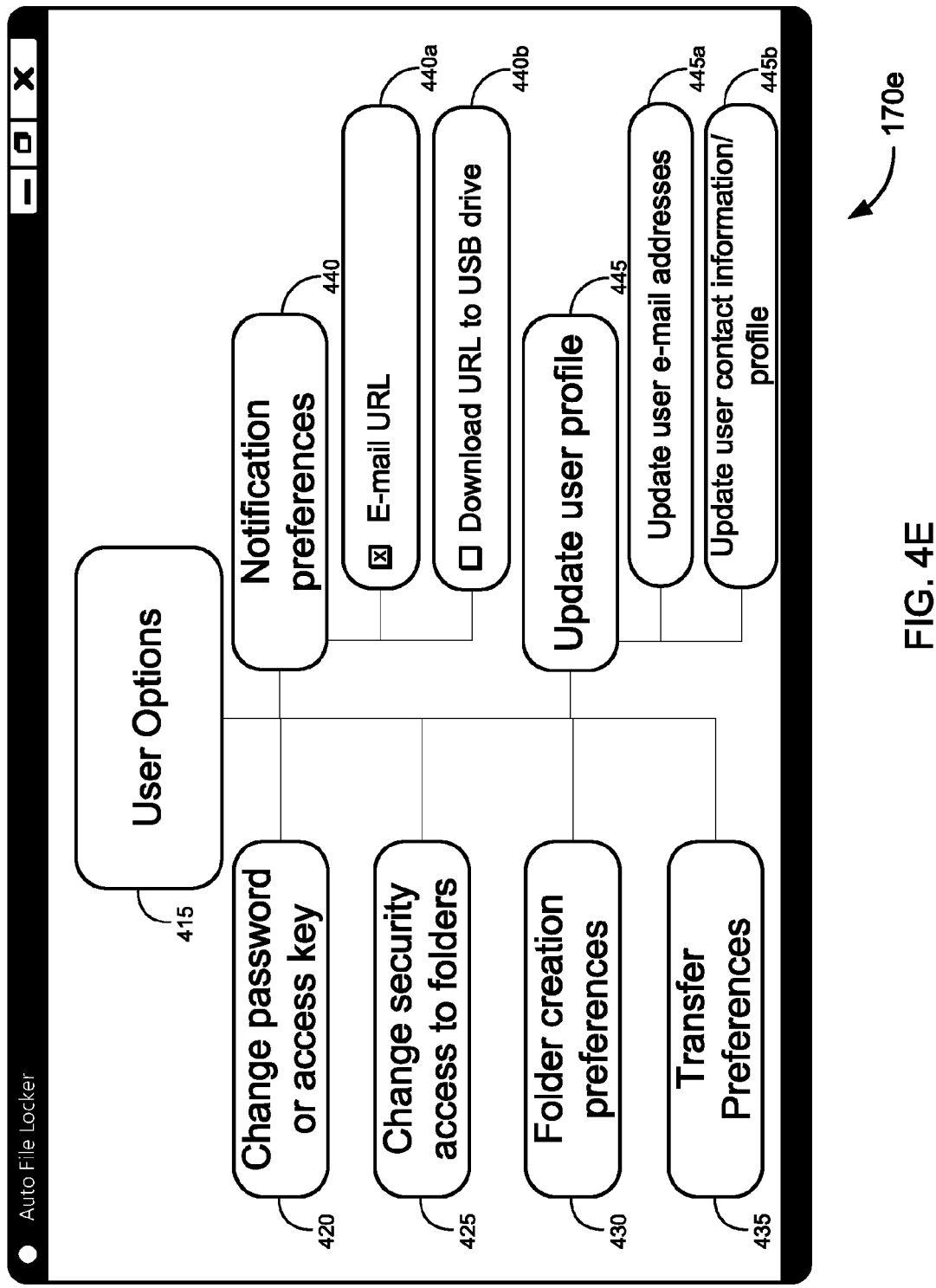

Referring now to FIGS. 4D and 4E, when the user clicks on the User Options button or link 415, the user interface might provide display screens 170d and/or 170e, which expand the selection to provide user interface devices for various additional user options, including (but not limited to): (i) changing the user password(s) or access key(s), by clicking on the Change password or access key button or link 420; (ii) changing security access settings for one or more of the data folders (including any public folder(s) 150, semi-private folder(s) 155, and very private folder(s) 160) associated with the uploading user (the user who is associated with the RG 105 or the USB drive 110), by clicking on the Change security access to folders button or link 425; (iii) change, update, or modify the folder creation preferences, by clicking on the Folder creation preferences button or link 430; (iv) changing, updating, or modifying transfer preferences, by clicking on the Transfer Preferences button or link 435; (v) changing, updating, or modifying notification preferences, by clicking on the Notification preferences button or link 440; and (vi) changing, updating, or modifying user profile(s), by clicking on the Update user profile button or link 445.

When the user clicks on any of buttons or links 420 to 445, the user interface might provide additional display screens to allow the user to perform the respective stated functions above. For example, clicking on the Folder creation preferences button or link 430 would cause the user interface to expand to allow the user to change folder name preferences (see Folder name preferences button or link 430a in FIG. 4D). Likewise, clicking on the Transfer preferences button 435 allows the user to (A) change data upload preferences (see Change data upload preferences button or link 435a), including selecting whether or not to automatically upload data when the USB is detected by the RG 105 (see Automatic upload when USB detected option 435d), (B) change data synchronization preferences (see Change data synchronization preferences button or link 435b), and (C) change data deletion preferences (see Change data deletion preferences button or link 435c). Similarly, changing notification preferences include selecting one or both of e-mailing the URL (see E-mail URL option 440a) and downloading URL to USB drive 115 (see Download URL to USB drive option 440b). In addition, updating user profile includes updating user e-mail addresses (see Update user e-mail addresses option 445a) and updating user contact information/profile (see Update user contact information/profile option 445b).

In the foregoing examples with reference to the user interface, it is described that the user has to click on the various buttons or links in order to cause the user interface to expand on the selections to present more options or to allow the user to access, modify, and update various user preferences and options. The present invention is not so limited. As noted above, a wide variety of user interface devices may be used in lieu of the examples given above. Merely by way of example, simply rolling one's mouse icon over the buttons or links may cause similar effects.

In the foregoing, the folders 150, 155, 160 on data server 140 (or on database 145) are described as each having an associated URL address to which a user may access over the network 135. However, the embodiments are not so limited, the data server 140 (and/or database 145) may be embodied in FTP sites, in which case instead of URLs being generated (at Step 270), an FTP address would be generated. As such, each step involving the URL would instead involve an FTP address. Alternatively, rather than multiple URL addresses or FTP sites, some embodiments may utilize a single URL or a single FTP site.

Figure 5:
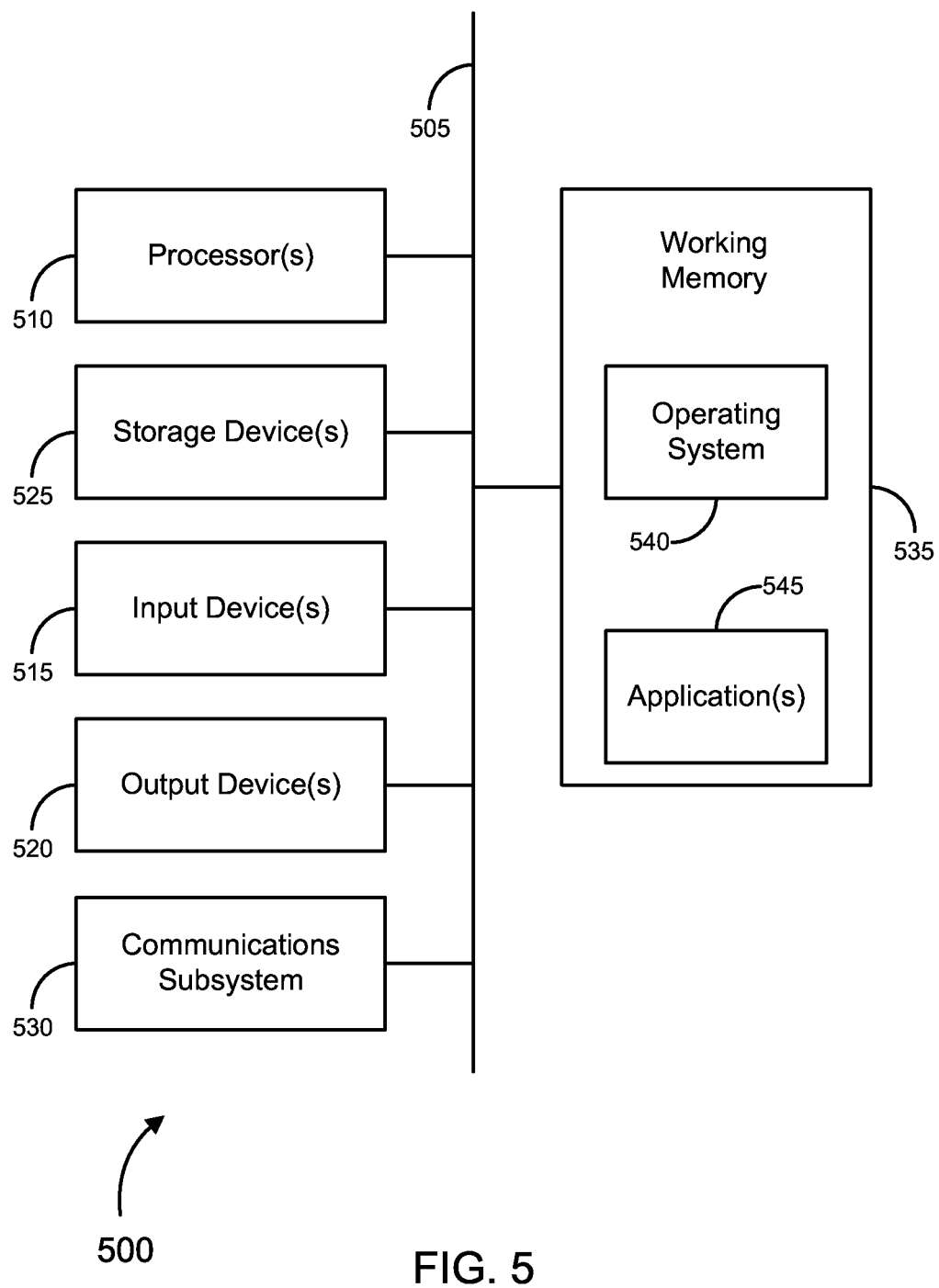
FIG. 5 is a generalized schematic diagram illustrating a computer system, in accordance with various embodiments.

FIG. 5 provides a schematic illustration of one embodiment of a computer system 500 that can perform the methods provided by various other embodiments, as described herein, and/or can function as a user computer, data server, database server, RG, etc. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer systems, and/or with any other devices described herein. In many embodiments, the computer system 500 will further comprise a working memory 535, which can include a RAM or ROM device, as described above.

The computer system 500 also may comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operation in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media.

Non-volatile media includes, for example, optical and/or magnetic disks, such as the storage device(s) 525. Volatile media includes, without limitation, dynamic memory, such as the working memory 535. Transmission media includes, without limitation, coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Common forms of physical and/or tangible computer readable media include, for example, USB drive, a memory chip, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
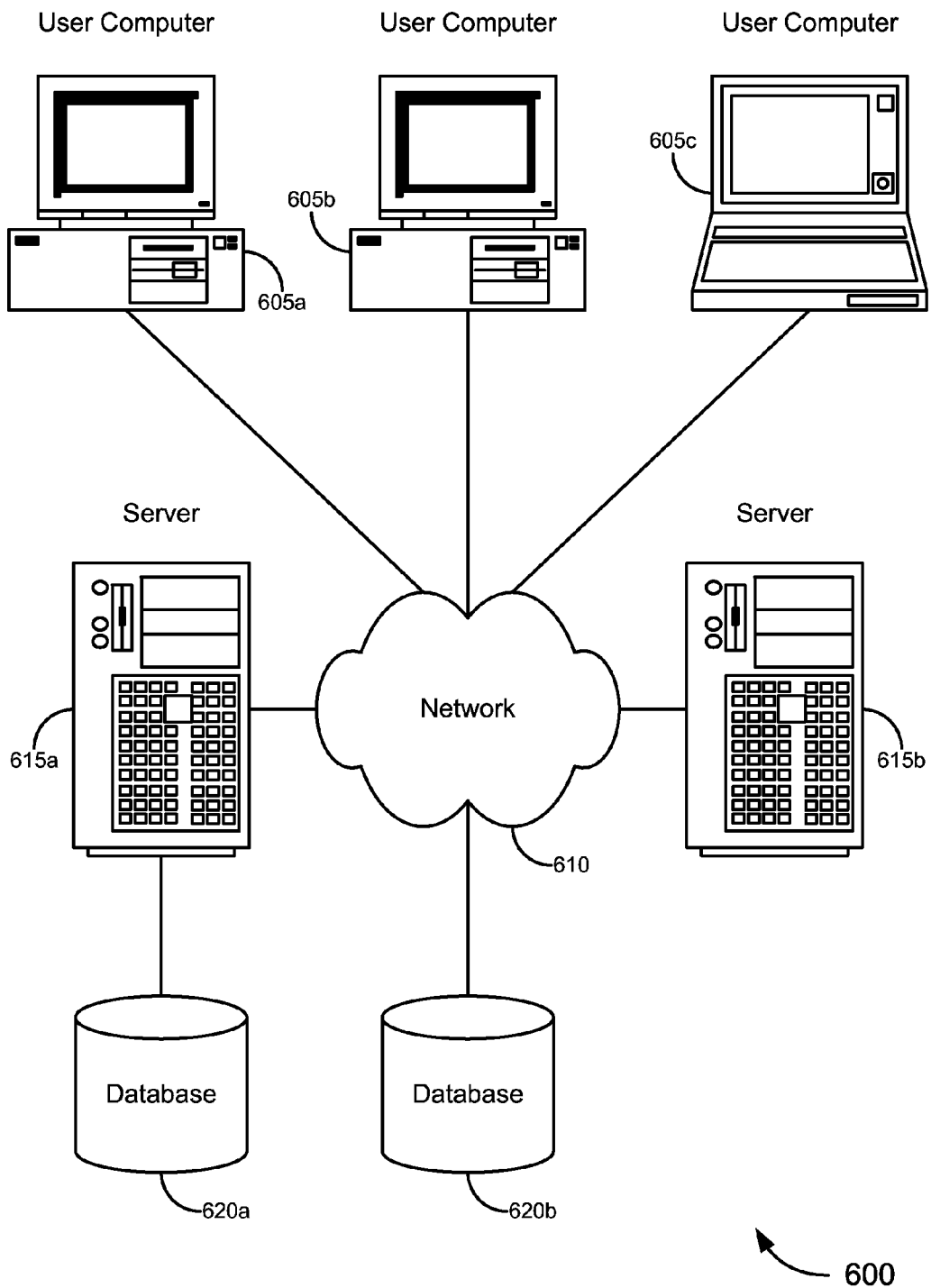
FIG. 6 is a block diagram illustrating a networked system of computers, which can be used in accordance with various embodiments.

As noted above, a set of embodiments comprises systems for providing file locker services. FIG. 6 illustrates a schematic diagram of a system 600 that can be used in accordance with one set of embodiments. The system 600 can include one or more user computers 605. A user computer 605 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer 605 can also have any of a variety of applications, including one or more applications configured to perform methods provided by various embodiments (as described above, for example), as well as one or more office applications, database client and/or server applications, and/or web browser applications. Alternatively, a user computer 605 can be any other electronic device, such as a thin-client computer, Internet-enabled mobile telephone, and/or personal digital assistant, capable of communicating via a network (e.g., the network 610 described below) and/or of displaying and navigating web pages or other types of electronic documents. Although the exemplary system 600 is shown with three user computers 605, any number of user computers can be supported.

Certain embodiments operate in a networked environment, which can include a network 610. The network 610 can be any type of network familiar to those skilled in the art that can support data communications using any of a variety of commercially-available (and/or free or proprietary) protocols, including without limitation TCP/IP, SNA™ IPX™ AppleTalk™, and the like. Merely by way of example, the network 610 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks. In a particular embodiment the network might include an access network of the ISP. In another embodiment, the network might include a core network of the ISP, and/or the Internet.

Embodiments can also include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer 605 and/or another server 615. In some embodiments, an application server can create web pages dynamically for displaying the information in accordance with various embodiments, such as for providing a user interface for the file locker system. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes;

likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for uploading and synchronizing data, comprising:
    a data server device in an Internet service provider ("ISP") network; and
    a residential gateway device that is in communication with the data server device over the ISP network, the residential gateway device comprising at least one universal serial bus ("USB") port configured to receive a USB memory drive,
    wherein the residential gateway device is configured to establish a connection between the ISP network and a residential network, and to upload data stored on the USB memory drive to the data server device;
    wherein the data server device is configured to synchronize data on the data server device with the data stored on the USB memory drive;
    wherein the data stored on the USB memory drive includes at least one of public data, semi-private data, and private data, wherein public data is data that is accessible by anyone, semi-private data is data that is accessible by a single access key that is shared with at least one user, and private data is data that is only accessible by one or more customer keys each of which correspond to only a single user; and
    wherein when the USB port uploads data to the data server device that is not currently stored on the data server device, the data server device is configured to:
        determine whether the data stored on the USB memory drive is public data, semi-private data, or private data;
        create at least one public folder on the data server device based on a determination that the data includes public data;
        create at least one semi-private folder on the data server device based on a determination that the data includes semi-private data, wherein the at least one semi-private folder is accessible by the single access key; and
        create at least one private folder on the data server device based on a determination that the data includes private data, wherein the at least one private folder is accessible by the one or more customer keys.

2. The system of claim 1, wherein the residential gateway device being configured to upload data stored on the USB memory drive to the data server device comprises the residential gateway device being configured to:
    detect the presence of a USB memory drive connected to the at least one USB port; and
    send a notification to the data server device indicating that data stored on the USB memory drive is ready for uploading to, or synchronizing with data on, the data server device,
    wherein the data server device, upon receiving said notification from the residential gateway device, is configured to initiate uploading of all the data on the USB memory drive to the data server device.

3. The system of claim 2, wherein
    the residential gateway device is further configured to:
        detect the removal of the USB memory drive from the at least one USB port; and
        send a notification to the data server device that the USB drive has been removed; and
    the data server device is further configured to:
        delete the data on the data server device, in response to receiving the notification that the USB drive has been removed.

4. The system of claim 1, wherein the data server device, when synchronizing data on the data server device with the data stored on the USB memory drive, is further configured to delete data from the data server device corresponding to data that has been deleted from the USB memory drive.

5. The system of claim 1, wherein the data server device is further configured to:
    generate a uniform resource locator ("URL") corresponding to each public folder, semi-private folder, or private folder that is created on the data server device; and
    perform at least one of:
        downloading each generated URL to the USB memory drive via the ISP network, and store said each generated URL on the USB memory drive; and
        sending via e-mail each generated URL to at least one e-mail address corresponding to each user associated with the residential gateway device or to at least one e-mail address corresponding to each user associated with the USB memory drive.

6. The system of claim 5, wherein the data server device includes a user web interface accessible by the URL, wherein the user web interface is configured to allow a user to perform at least one of:
    checking status of data upload, data synchronization, or data deletion;
    accessing the data stored on the data server device; and
    managing user options including passwords or access keys; security access to particular folders; folder creation and folder name preferences; transfer preferences including data upload, synchronization, and deletion preferences; notification preferences for e-mailing and/or downloading the URL; and updating user profile information including e-mail addresses.

7. The system of claim 1, wherein the data server device includes a file transfer protocol ("FTP") server, and wherein the URL includes an FTP file address.

8. The system of claim 1, wherein the at least one USB port includes:
    a first USB port configured to act as a USB memory drive, wherein when a user computer is connected to the first USB port, the residential gateway device is configured to perform at least one of sending a notification to the data server device indicating that data stored on the user computer is ready for uploading to, or synchronizing with data on, the data server device, and uploading the data stored on the user computer to the data server device; and
    a second USB port configured to receive a USB memory drive, wherein the residential gateway device is configured to perform at least one of sending a notification to the data server device indicating that data stored on the USB memory drive is ready for uploading to, or synchronizing with data on, the data server device, and uploading the data stored on the USB memory drive to the data server device.

9. A method of uploading data to, and synchronizing data with, a data server device in an Internet service provider ("ISP") network, the method comprising:
  establishing, by a residential gateway device, a connection between the ISP network and a residential network, wherein said residential gateway device is in communication with the data server device over the ISP network;
  receiving, at least one universal serial bus ("USB") port of the residential gateway device, a USB memory drive; and
  performing at least one of:
    uploading, by the residential gateway device, data stored on the USB memory drive to the data server device; and
    synchronizing, by the data server device, data on the data server device with the data stored on the USB memory drive,
  wherein the data stored on the USB memory drive includes at least one of public data, semi-private data, and private data, wherein public data is data that is accessible by anyone, semi-private data is data that is accessible by a single access key that is shared with at least one user, and private data is data that is only accessible by one or more customer keys each of which correspond to only a single user, and
  wherein when the USB port uploads data to the data server device that is not currently stored on the data server device, the method further comprises:
    determining, by the data server device, whether the data stored on the USB memory drive is public data, semi-private data, or private data;
    creating, by the data server device, at least one public folder on the data server device based on a determination that the data includes public data;
    creating, by the data server device, at least one semi-private folder on the data server device based on a determination that the data includes semi-private data, wherein the at least one semi-private folder is accessible by the single access key; and
    creating, by the data server device, at least one private folder on the data server device based on a determination that the data private data, wherein the at least one private folder is accessible by the one or more customer keys.

10. The method of claim 9, wherein uploading, by the residential gateway device, data stored on the USB memory drive to the data server device comprises:
  detecting, by the residential gateway device, the presence of a USB memory drive connected to the at least one USB port;
  sending, by the residential gateway device, a notification to the data server device indicating that data stored on the USB memory drive is ready for uploading to, or synchronizing with data on, the data server device; and
  uploading, by the data server device, all the data on the USB memory drive to the data server device, upon receiving said notification from the residential gateway device.

11. The method of claim 9, wherein synchronizing data on the data server device with the data stored on the USB memory drive includes deleting, by the data server device, data from the data server device corresponding to data that has been deleted from the USB memory drive.

12. The method of claim 9, further comprising:
  generating, by the data server device, a uniform resource locator ("URL") corresponding to each public folder, semi-private folder, or private folder that is created on the data server device; and
  performing at least one of:
    downloading, by the data server device, each generated URL to the USB memory drive via the ISP network, and storing said each generated URL on the USB memory drive; and
    sending via e-mail, by the data server device, each generated URL to at least one e-mail address corresponding to each user associated with the residential gateway device or to at least one e-mail address corresponding to each user associated with the USB memory drive.

13. Computer software stored on a residential gateway device that when executed by the residential gateway device causes the residential gateway device to:
  establish a connection between an Internet service provider ("ISP") network and a residential network, wherein said residential gateway device is in communication with a data server device over the ISP network;
  determine that a universal serial bus ("USB") memory drive has been connected to at least one USB port on the residential gateway device;
  send a notification to the data server device over the ISP network, said notification indicating that data stored on the USB memory drive is ready for uploading to, or synchronizing with data on, the data server device;
  determine whether the data stored on the USB memory drive that is not currently stored on the data server device is public data, semi-private data, or private data, wherein public data is data that is accessible by anyone, semi-private data is data that is accessible by a single access key that is shared with at least one user, and private data is data that is only accessible by one or more customer keys each of which correspond to only a single user;
  create at least one public folder on the data server device based on a determination that the data includes public data, upload the public data from the USB memory drive, and store, in the at least one public folder, said public data uploaded from the USB memory drive;
  create at least one semi-private folder on the data server device based on a determination that the data includes semi-private data, wherein the at least one semi-private folder is accessible by the single access key, upload the semi-private data from the USB memory drive, and store, in the at least one semi-private folder, said semi-private data uploaded from the USB memory drive; and
  create at least one private folder on the data server device based on a determination that the data includes private data, wherein the at least one private folder is accessible by the one or more customer keys, upload the private data from the USB memory drive, and store, in the at least one private folder, said private data uploaded from the USB memory drive.

14. Computer software stored on a data server device in an Internet service provider ("ISP") network that when executed by the data server device causes the data server device to:
  determine whether data stored on a universal serial bus ("USB") memory drive connected to at least one USB port at a residential gateway device, is ready to be uploaded to the data server device via the residential gateway device over the ISP network;

determine whether the data that is ready to be uploaded to the data server device from the USB memory drive is not currently stored on the data server device;

determine whether the data stored on the USB memory drive that is not currently stored on the data server device is public data, semi-private data, or private data, wherein public data is data that is accessible by anyone, semi-private data is data that is accessible by a single access key that is shared with at least one user, and private data is data that is only accessible by one or more customer keys each of which correspond to only a single user;

create at least one public folder on the data server device based on a determination that the data includes public data, upload the public data from the USB memory drive, and store, in the at least one public folder, said public data uploaded from the USB memory drive;

create at least one semi-private folder on the data server device based on a determination that the data includes semi-private data, wherein the at least one semi-private folder is accessible by the single access key, upload the semi-private data from the USB memory drive, and store, in the at least one semi-private folder, said semi-private data uploaded from the USB memory drive; and create at least one private folder on the data server device based on a determination that the data includes private data, wherein the at least one private folder is accessible by the one or more customer keys, upload the private data from the USB memory drive, and store, in the at least one private folder, said private data uploaded from the USB memory drive.

15. The computer software of claim 14, that when executed by the data server device further causes the data server device to:

determine whether data has been deleted from the USB memory drive that is currently stored on the data server device;

delete the data from the data server device corresponding to the data that has been deleted from the USB memory drive, based on said determination.

16. The computer software of claim 15, that when executed by the data server device further causes the data server device to:

generate a uniform resource locator ("URL") corresponding to each public folder, semi-private folder, or private folder that is created on the data server device; and perform at least one of:

downloading each generated URL to the USB memory drive via the ISP network, and storing said each generated URL on the USB memory drive; and sending via e-mail each generated URL to at least one e-mail address corresponding to each user associated with the residential gateway device or to at least one e-mail address corresponding to each user associated with the USB memory drive.

17. The computer software of claim 16, that when executed by the data server device further causes the data server device to generate a user web interface accessible by the URL, wherein the user web interface is configured to allow a user to perform at least one of:

checking status of data upload, data synchronization, or data deletion;

accessing the data stored on the data server device; and managing user options including passwords or access keys; security access to particular folders; folder creation and folder name preferences; transfer preferences including data upload, synchronization, and deletion preferences; notification preferences for e-mailing and/or downloading the URL; and updating user profile information including e-mail addresses.

* * * * *